Patented Nov. 15, 1938

2,136,767

UNITED STATES PATENT OFFICE 2,136,767

METHOD OF REFINING MINERAL OILS BY MEANS OF AROMATIC FLUORINE COMPOUNDS

Ernst Terres, Berlin, Germany, and Josef Moos, New York, and Hans Ramser, Long Island City, N. Y., assignors to Edeleanu Gesellschaft m. b. H., a corporation of Germany No Drawing. Application October 25, 1937, Serial No. 170,973

16 Claims. (Cl. 196—13)

This invention relates to the refining of hydrocarbon oils and more particularly to solvent extraction and solvent dewaxing of mineral oil by means of organic fluorine compounds, and this application is a continuation in part of application Serial No. 23,130, filed May 23, 1935, for Method of refining lubricating oils.

This invention contemplates the separation of paraffine type hydrocarbons from non-paraffinic ones by solvent extraction and further the separation of solid hydrocarbons, or wax, from those which are liquid at low temperatures, by the use of suitable fluorinated solvents, and for the purpose of producing high quality lubricating oils of low pour point.

In our copending applications Serial Nos. 22,914 and 23,130, we have disclosed that certain liquid or liquefied organic fluorine compounds are especially advantageous for dewaxing and that others have special advantages in solvent extraction of mineral oils.

In continuation of this experimental work a large number of aliphatic and aromatic fluorine and other halogen containing compounds were prepared and their behavior and suitability in solvent refining and solvent dewaxing of mineral oils were investigated and became known. Also certain rules as to the influence of the introduction of chlorine and/or bromine into certain aliphatic and aromatic hydrocarbons on the one hand and that of the introduction of one or more fluorine atoms on the other hand became apparent as will be noted from the description of our invention.

The respective selective solvent action of, for example, phenol and aniline is well known. It is also known, that, if one or more chlorine atoms are introduced into the phenyl radical, the solvent power of the chlorinated compounds, chlorophenol and chloro-aniline, is much greater than that of phenol and aniline. Solvent power of a selective solvent is generally measured by relationships between amount of selective solvent used and quality of raffinate obtained. For example, generally one volume of para-chlorophenol will produce a like amount of refined oil of the same quality as two volumes of phenol will produce. The more powerful a selective solvent is the less satisfactory is usually its selectivity, that is, its ability to dissolve only the low viscosity index hydrocarbons of mineral oil and to leave undissolved all the high viscosity index compounds, for example.

It is known that bromine will act in a similar manner to chlorine when introduced into organic, especially aliphatic, solvents with respect to the solvent power and selectivity.

It is our invention to have discovered that fluorine exerts exactly the opposite effect of either chlorine or bromine. For example, parafluoroaniline and 2.4 difluoroaniline are more selective and less powerful solvents than either chloroaniline or aniline.

This particular action of fluorine makes it possible to change the selectivity and solvent power of selective solvents at will. The substitution of one or more hydrogen atoms in a selective solvent by fluorine increases the selectivity of the solvent. At the same time, non-selective solvents may be made selective by the introduction of fluorine. For example, propane is known to dissolve mineral oil entirely at temperatures of from about +50 to +150° F., except for asphaltenes. It exerts no distinctive solvent action on low viscosity index and on high viscosity index compounds, dissolving both with equal facility. If, however, two or more hydrogen atoms of propane are substituted by fluorine the resultant compounds, 1, 2, difluoropropane, 1, 3 difluoropropane and 1, 2, 3 trifluoropropane—have all the characteristics of selective solvents; they preferably dissolve the aromatic, hydroaromatic and unsaturated hydrocarbons leaving undissolved the paraffinic type or high viscosity index compounds.

Anisol ($CH_3$—O—$C_6H_5$) and orthofluoro anisol ($CH_3$—O—$C_6H_4F$) are corresponding examples in the aromatic series of hydrocarbons, anisol being a non-selective solvent and orthofluoro anisol being selective. Orthofluoro anisol is particularly adapted for the refining of mineral oils and for the production of high quality lubricating oils as will be shown later on by way of examples.

The number of fluorine atoms which must be introduced into a non-selective solvent in order to make it selective we find will depend to a large extent on the character and size of the molecule of the organic solvent. Methane and ethane may in some respects be considered selective and therefore the substitution of one hydrogen by fluorine produces the highly selective solvents methylfluoride ($CH_3F$) and ethylfluoride ($C_2H_5F$); whereas it is found that the corresponding chlorine derivatives $CH_3Cl$ and $C_2H_5Cl$ are non-selective. In cases of a large organic radical, for instance, propyl ($C_3H_7$), the introduction of one fluorine atom is not sufficient to produce selectivity. Propylfluoride ($C_3H_7F$) is still non-selective. Only the introduction of more than one fluorine atom produces the desired selectivity which we find in di- and tri-fluoropropane.

Likewise, we find the same to be true in the case of more complex aliphatic compounds. N-butylfluoride, n-amylfluoride, n-hexylfluoride and n-heptylfluoride are all non-selective, and much more than one fluorine atom would have to be introduced to establish selectivity.

In the case of non-selective aliphatic compounds which already contain other halogen than fluorine, correspondingly more fluorine must be added because of the antagonistic effect of chlorine and/or bromine. For example, di-bromo-mono-fluoro-ethane, $C_2H_3Br_2F$, was found to be non-selective, whereas mono-bromo-difluoroethane, $C_2H_3BrF_2$, showed excellent characteristics as a selective solvent. (See example 1 below). As a general rule, aliphatic halogenated solvents must contain at least as many, and preferably more fluorine atoms than chlorine and bromine atoms together in order to be selective for extracting low from high viscosity index hydrocarbons, or for separating paraffinic and non-paraffinic hydrocarbon groups.

In order to substantiate further the above statement the following fluorine and fluorine plus other halogen containing aliphatic hydrocarbons, designated as Class A, were synthesized and tested and were found to be selective with both low and high boiling mineral oil fractions.

*Class A.—Selective fluorine and fluorine plus other halogen containing aliphatic solvents.*

| | |
|---|---|
| Methylfluoride | $CH_3F$ |
| Methylenefluoride | $CH_2F_2$ |
| Fluoroform | $CHF_3$ |
| Carbontetrafluoride | $CF_4$ |
| Mono-chloro-monofluoro-methane | $CH_2ClF$ |
| Mono-bromo-monofluoro-methane | $CH_2BrF$ |
| Mono-chloro-difluoro-methane | $CHClF_2$ |
| Mono-chloro-trifluoro-methane | $CClF_3$ |
| Ethylfluoride | $C_2H_5F$ |
| sym. Difluoroethane | $CH_2F$—$CH_2F$ |
| sym. Monobromo-mono-fluoroethane | $CH_2Br$—$CH_2F$ |
| 2,-monobromo-1, difluoro-ethane | $CH_2Br$—$CHF_2$ |
| Mono-chloro-trifluoroethane | $CHClF$—$CHF_2$ |
| Difluoro-di-chloro-ethane | $C_2H_2Cl_2F_2$ |
| Trifluoro-di-chloroethane | $C_2HCl_2F_3$ |
| Tetrafluoro-di-chloroethane | $C_2Cl_2F_4$ |
| 1,1 monochloro-di-fluoroethane | $CClF_2$—$CH_3$ |
| 1,1,1 trifluoroethane (methylfluoroform) | $CF_3$—$CH_3$ |
| 1,2 difluoropropane | $CH_2F$—$CHF$—$CH_3$ |
| 1,3 difluoropropane | $CH_2F$—$CH_2$—$CH_2F$ |
| 1,2,3 trifluoropropane | $CH_2F$—$CHF$—$CH_2F$ |
| 1,2 mono-bromo-monofluoropropane | $CH_2Br$—$CHF$—$CH_3$ |
| 1,3 mono-bromo-mono-fluoropropane | $CH_2Br$—$CH_2$—$CH_2F$ |
| Allylfluoride | $CH_2$=$CH$—$CH_2F$ |

The efficacy of 2-monobromo-1-difluoroethane as a selective solvent and as one member of the above cited Class A will now be shown by way of specific example.

*Example 1*

A mixed base, dewaxed Mid-Continent motor oil was extracted with 100% plus 2×75% by volume of monobromo-di-fluoro-ethane at 77° F. by the multiple batch method. After each agitating the raffinate and extract phases were allowed to stratify and were thereupon separated. The solvent was removed from both phases by distillation under diminished pressure and the refined oil, after clay treatment at 450° F. with 10% by weight of activated clay, showed the following specifications in comparison with the untreated distillate:

| | Untreated distillate | Raffinate |
|---|---|---|
| Yield percent by volume | 100 | 64.1 |
| °A. P. I | 23.2 | 27.5 |
| Vis. at 100° F | 1287 | 811 |
| Vis. at 210° F | 92 | 79 |
| Viscosity index | 78 | 95 |
| Carbon residue | 1.9 | 0.6 |

Also non-selective aromatic hydrocarbons and their derivatives may be made selective by the introduction of one or more fluorine atoms. It was explained above that the amount of fluorine which is necessary to produce selectivity in aliphatic-halogen-free-hydrocarbons will largely depend on the size of the aliphatic radical. Monofluoropropane is not selective in distinction to di- and trifluoropropane. This characteristic is even more evident in case of aromatic hydrocarbons because of the high solvency effect of the benzol ring. For example monofluorobenzol, $C_6H_5F$, metadifluorobenzol, m-$C_6H_4F_2$, and 1,2,4 trifluorobenzol, $C_6H_3F_3$, are not selective, neither is the highly fluorinated meta-fluoro-trifluorotoluol, m-$C_6H_4F(CF_3)$, in which fluorine substitution was made in the benzol ring as well as in the side chain.

However, in certain phenylethers, for example, anisol, $C_6H_5$—O—$CH_3$, and phenetol

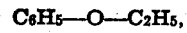

$C_6H_5$—O—$C_2H_5$, which per se are not selective, selectivity could be produced by fluorination in meta position to the methoxy—and ethoxy group respectively. The corresponding para-derivatives, however, are not selective.

The following table lists the selective aromatic fluorine solvents as Class B.

| | |
|---|---|
| o-fluoroanisol | o-$C_6H_4(OCH_3)F$ |
| o-fluorophenetol | o-$C_6H_4(OC_2H_5)F$ |
| p-fluoroaniline | p-$C_6H_4(NH_2)F$ |
| m-nitro-tri-fluorotoluol | m-$C_6H_4(NO_2)(CF_3)$ |
| 2,4, nitro-difluorobenzol | 2,4 $C_6H_3(NO_2)F_2$ |
| 2,4, difluoro-aniline | 2,4 $C_6H_3(NH_2)F_2$ |
| Trifluoro-m-toluidine | m-$C_6H_4(NH_2)CF_3$ |
| Trifluoro-m-cresol | m-$C_6H_4(OH)CF_3$ |

The following examples are illustrative of the excellent refining effect of this class of fluorinated aromatic hydrocarbon derivatives when used as selective solvents.

*Example 2*

A motor oil from Mid-Continent crude was extracted with 100+ 50 Vol.% orthofluoroanisol, o-$C_6H_4(OCH_3)F$, at −3° F. In each of the two batches the oil and solvent were properly agitated at the mentioned temperature, the layers were separated from each other after stratification was completed and the solvent was thereupon recovered by distillation. The properties of the refined oil, after contacting with 10% clay at 450°

F., and those of the original stock are given in the table below.

Example 3

A Pennsylvania Bright Stock of 25.9° A. P. I. gravity was extracted with 100+ 50 Vol.% ortho-fluoroanisol at 100° F. by the multiple batch method. After recovery of the solvent from raffinate and extract layer by distillation at reduced pressure a raffinate with a viscosity index of 115 was obtained. (See the following table).

|  | Mid-Continent | | Pennsylvania | |
|---|---|---|---|---|
|  | Untreated distillate | Raffinate | Untreated bright stock | Raff. |
| Yield percent by vol | 100 | 58 | 100 | 72.2 |
| °A. P. I. | 23.2 | 28.5 | 25.9 | 28.2 |
| Vis. 100 | 1287 | 695 | 846 at 130° F. | 735 at 130° F. |
| Vis. 210 | 92 | 74.4 | 148 | 141.2 |
| Visc. index | 78 | 99 | 102 | 115 |
| Carbon residue | 1.9 | 0.32 | 2.5 | 1.3 |
| Color NPA | Dark | 5+ | | |

From the above examples it will be evident that our fluorinated aliphatic and aromatic selective solvents are especially suited for producing high quality motor oils and bright stocks.

It is further to be understood that, instead of the batch treating method described above, also the well known countercurrent operating method may be used, employing therefor either a tower, packed with Raschig rings or provided with plates, or a mixing and settling tank equipment consisting of three or more stages.

Our invention is not limited to the use of the selective solvents of Classes A and B alone. In some instances it will be of advantage to carry out the extraction in the presence of an auxiliary solvent for the purpose of facilitating the extraction and further controlling the extent thereof. Such auxiliary solvents may be selected from the class of aromatic hydrocarbons, if the solvent power of the selective solvent is to be increased, or from the class of alcohols—including polyhydric alcohols—if the selectivity of the selective solvent is to be improved. Also light petroleum fractions, such as propane and butane may be used. Sometimes the presence of dichloro-difluoromethane or any of the non-selective fluorine solvents, listed below under Classes C and D, during the extraction with a solvent of Class A or B will be of advantage, depending upon the kind of stock to be refined—whether it is a residual oil or a distillate—and upon the quality of the finished product which is desired.

Likewise the amount of selective solvent to be used in our extraction processes will depend upon viscosity and origin of the oil to be treated and upon the desired quality of finished product. We may use from one-half to ten volumes of solvent per volume of untreated oil. The selection of a solvent of Classes A and B, especially suitable for any particular oil stock, and the decision whether an auxiliary solvent of the types mentioned above should be employed together with one of our selective solvents, will be possible to those skilled in the art without difficulty, and without deviating from our invention.

Our invention is furthermore not limited to the extraction of lubricating fractions or lubricating oil residues, but may also be adapted to the refining of naphthas, kerosenes, gas oils, Diesel oils and similar products. For the extraction of these lower boiling mineral oil fractions the highly selective solvents of Classes A and B, as disclosed above, may be used to especial advantage. Some of these highly selective solvents, which are correspondingly low in solvent power, are for example the fluorine derivatives of methane and ethane, which do not contain other halogen; or the mono- and di-fluoroanilines.

During our study we also prepared a large number of fluorine and fluorine plus other halogen containing aliphatic and aromatic solvents, which are given below as Classes C and D respectively, and which are not selective as between low and high viscosity index hydrocarbons, because of the predominant influence, exerted by the organic radical and/or the chlorine and bromine present, in accordance with our theory.

Solvents of Class C

| | |
|---|---|
| Di-chloro-mono-fluoromethane | $CHCl_2F$ |
| Tri-chloro-mono-fluoromethane | $CCl_3F$ |
| Di-iodo-mono-fluoromethane | $CHI_2F$ |
| Mono-chloro-mono-bromo-mono-fluoromethane | $CHClBrF$ |
| Di-bromo-mono-fluoromethane | $CHBr_2F$ |
| Tri-bromo-mono-fluoromethane | $CBr_3F$ |
| Tetra-chloro-di-fluoroethane | $C_2Cl_4F_2$ |
| Tri-bromo-mono-fluoroethane | $C_2H_2Br_3F$ |
| Tri-chloro-mono-fluoroethane | $C_2H_2Cl_3F$ |
| Tetrachloro-mono-fluoroethane | $C_2HCl_4F$ |
| Tri-chloro-difluoroethane | $C_2HCl_3F_2$ |
| Di-bromo-mono-fluoroethane | $C_2H_3Br_2F$ |
| Di-chloromono-fluoroethylene | $C_2HCl_2F$ |
| Tri-chloro-mono-fluoroethylene | $C_2Cl_3F$ |
| Di-bromo-mono-fluoroethylene | $C_2HBr_2F$ |
| n-Propylfluoride | $C_3H_7F$ |
| iso-Propylfluoride | $C_3H_7F$ |
| n-Butylfluoride | $C_4H_9F$ |
| n-Amylfluoride | $C_5H_{11}F$ |
| n-Hexyfluoride | $C_6H_{13}F$ |
| n-Heptylfluoride | $C_7H_{15}H$ |

Solvents of Class D

| | |
|---|---|
| Mono-fluoro-benzol | $C_6H_5F$ |
| Meta-di-fluorobenzol | $m-C_6H_4F_2$ |
| 1,2,4 Trifluorobenzol | $1,2,4-C_6H_3F_3$ |
| p-Fluoroanisol | $p-C_6H_4(OCH_3)F$ |
| p-Fluorophenetol | $p-C_6H_4(OC_2H_5)F$ |
| p-Fluoro-bromo-benzol | $p-C_6H_4BrF$ |
| o-Flouro-chloro-benzol | $o-C_6H_4ClF$ |
| m-Fluoro-chlorobenzol | $m-C_6H_4ClF$ |
| o-Fluorotoluol | $o-C_6H_4(CH_3)F$ |
| m-Fluorotoluol | $m-C_6H_4(CH_3)F$ |
| p-Fluorotoluol | $p-C_6H_4(CH_3)F$ |
| Trifluorotoluol | $C_6H_5(CF_3)$ |
| m-Fluoro-trifluorotoluol | $m-C_6H_4(CF_3)F$ |
| p-Fluoro-iodo-benzol | $p-C_6H_4IF$ |
| Mono-fluoro-cyclohexane | $C_6H_{11}F$ |
| Mono-fluoro-naphthalene | $C_{10}H_7F$ |

These solvents are particularly adapted for dewaxing hydrocarbon oils, because they exert little solvent power on the solid paraffine hydrocarbons and substantially complete solvent action on the liquid hydrocarbons at low temperature. Our dewaxing solvents of Classes C and D may be employed in amounts of from 1 to 10 volumes per each volume of waxy oil to be dewaxed; in general, however, we employ from 200 to 400 Vol. % based on waxy oil. Moreover certain amounts of selective solvents, either of Classes A and B or any other known selective solvent, may be used together with the dewaxing solvents of Classes C and D, the purpose of the former being to further reduce the solubility of the wax in the solvent mixture at low temperature. The amount of selective solvent to be added is of course limited in that phase separation must not occur at the dewaxing temperature. In general we employ from 15 to 35 Vol. % solvent of Classes A or B and from 85 to 65 Vol. % of Classes C or D for dewaxing treatment. The dewaxing treatment may either precede or follow the extraction treatment by suitably adjusting the proportions of the selective and non-selective solvents and the temperatures of extraction and dewaxing to avoid phase separation during the dewaxing treatment and to avoid precipitation of wax during the extraction treatment.

In the claims the term "selective solvent" is applied to such liquids and liquefied gases as have a preferential solvent action for certain constituents of mineral oils only, such as the non-paraffinic or aromatic, hydroaromatic and unsaturated constituents, for example, as contrasted with the paraffinic group of constituents. which are insoluble in the selective solvent; the latter having a higher viscosity index and a higher A. P. I. gravity than the former, and being substantially free from oxidizable and gummy substances which are so undesirable in lubricating oils.

By "predominantly fluorine containing" as applied to a solvent, we mean that the substance contains fluorine in sufficient quantity to overcome the effect of the presence of other halogens or organic radicals tending to increase the solvent power of the substance, such as to give the substance the properties of the selected solvent as above defined. The term "liquefied" means that the substance referred to is used in the liquid state, whether normally liquid or not.

Reference is made to our companion application, Ser. No. 170,974, filed contemporaneously herewith, wherein the method of refining mineral oils with a selective solvent including organic fluorine compounds is broadly claimed.

We claim the following as our invention:

1. A method of refining a mineral oil comprising extracting the oil with a predominantly fluorine containing liquefied aromatic hydrocarbon compound at such temperature as to produce a separation into two phases respectively containing relatively paraffinic and non-paraffinic constituents, separating the phases from each other, and recovering the selective solvent therefrom.

2. A method of refining a mineral oil comprising extracting the oil with a predominantly fluorine containing liquefied aromatic hydrocarbon derivative, as a selective solvent, in admixture with an auxiliary solvent at such temperature as to produce a separation into two phases respectively containing relatively paraffinic and non-paraffinic constituents, separating the phases from each other, and recovering the selective solvent and the auxiliary solvent therefrom.

3. A method of refining a mineral oil comprising extracting the oil with a predominantly fluorine containing liquefied aromatic hydrocarbon derivative, as a selective solvent, in admixture with an organic auxiliary solvent of the class which is miscible in any proportion with the oil and with the selective solvent, at such temperature as to produce a separation into two phases respectively containing relatively paraffinic and non-paraffinic constituents, separating the phases from each other, and recovering the solvents therefrom.

4. A method of refining a mineral oil comprising extracting the oil with a predominantly fluorine containing liquefied aromatic hydrocarbon derivative, as a selective solvent, in admixture with an organic auxiliary solvent of the class which is miscible in any proportion with the selective solvent but not with the oil, at such temperature as to produce a separation into two phases respectively containing relatively paraffinic and non-paraffinic constituents, separating the phases from each other, and recovering the solvents therefrom.

5. A method of refining a mineral oil comprising extracting the oil with a predominantly fluorine containing liquefied aromatic hydrocarbon derivative, as a selective solvent, in admixture with an organic auxiliary solvent of the class which is miscible in any proportion with the oil but not with the selective solvent, at a temperature to produce a separation into two phases respectively containing relatively paraffinic and non-paraffinic constituents, separating the phases from each other, and recovering the solvents therefrom.

6. A method of dewaxing a mineral oil comprising dissolving the oil in a mixture of a liquefied predominantly fluorine containing aromatic hydrocarbon derivative and an auxiliary solvent of the class which is miscible in any proportion with both the oil and said fluorinated aromatic hydrocarbon derivative, the fluorinated aromatic hydrocarbon derivative and auxiliary solvent being present in such proportions as not to produce a separation into two liquid layers at the dewaxing temperature, cooling the mixture to below the desired pour point, removing the precipitated wax therefrom, and recovering the solvents from the dewaxed oil solution and from the wax.

7. A method of dewaxing a mineral oil comprising dissolving the oil in a mixture of a liquefied predominantly fluorine containing aromatic hydrocarbon derivative and an auxiliary solvent of the class of benzol and its homologues miscible with both the oil and said fluorinated aromatic hydrocarbon derivative, the fluorinated aromatic hydrocarbon derivative and auxiliary solvent being present in such proportions as not to produce a separation into two liquid layers at the dewaxing temperature, cooling the mixture to below the desired pour point, removing the precipitated wax therefrom and recovering the solvents from the dewaxed oil solution and from the wax.

8. A method of dewaxing a mineral oil comprising dissolving the oil in a mixture of a liquefied fluorine containing aromatic hydrocarbon derivative and an auxiliary solvent of the class which is miscible in any proportion with the oil but not with said fluorinated aromatic hydrocarbon derivative, the fluorinated aromatic hydrocarbon derivative and auxiliary solvent being present in such proportions as not to produce a separation into two liquid layers at the dewaxing temperature, cooling the mixture to below the desired pour point, removing the precipitated wax therefrom, and recovering the solvents from the dewaxed oil solution and from the wax.

9. A method of producing lubricating oils of high viscosity index and low pour point comprising extracting the oil with a selective solvent including a liquefied predominantly fluorine containing aromatic hydrocarbon derivative, as a selective solvent, adding to the raffinate phase so obtained before recovery of the solvent therefrom, further amounts of said selective solvent and an auxiliary solvent of the class which is miscible in any proportion with the oil, said solvents being added in such proportion as not to produce a separation into two liquid layers at the dewaxing temperature, cooling the mixture to below the desired pour point and removing the wax therefrom.

10. A method of producing lubricating oils of high viscosity index and low pour point comprising extracting the oil with a selective solvent including a liquefied predominantly fluorine containing aromatic hydrocarbon derivative, adding to the raffinate phase so obtained before recovery of the solvent therefrom, further amounts of the selective solvent and an auxiliary solvent of the class of benzol and its homologues, said solvents being added in such proportions as not to produce a separation into two liquid layers at the dewaxing temperature, cooling the mixture to below the desired pour point and removing the wax therefrom.

11. A method of producing lubricating oils of high viscosity index and low pour point comprising extracting the oil with a selective solvent including a liquefied predominantly fluorine containing aromatic hydrocarbon derivative in the presence of an auxiliary solvent of the class of benzol and its homologues, adding to the raffinate phase so obtained before recovery of the solvent therefrom, further amounts of the selective solvent and auxiliary solvent, said solvents being added in such proportions as not to produce a separation into two liquid layers at the dewaxing temperature, cooling the mixture to below the desired pour point and removing the wax therefrom.

12. A method of producing lubricating oils of high viscosity index and low pour point comprising extracting the oil with a selective solvent including a liquefied predominantly fluorine containing aromatic hydrocarbon derivative in the presence of an auxiliary solvent which is miscible with the oil, adding to the raffinate phase so obtained before recovery of solvent therefrom, further amounts of the selective solvent and auxiliary solvent, said solvents being added in such proportions as not to produce a separation into two liquid layers at the dewaxing temperature, cooling the mixture to below the desired pour point and removing the wax therefrom.

13. A method of producing lubricating oils of high viscosity index and low pour point comprising dewaxing the oil in accordance with the method of claim 6, adding to the dewaxed oil solution so obtained, before recovering the solvents therefrom, a further amount of the liquefied predominant fluorine containing aromatic hydrocarbon derivative to produce a separation into two phases respectively containing relatively paraffinic and non-paraffinic constituents, and separating the phases from each other.

14. A method of producing lubricating oils of high viscosity index and low pour point comprising dewaxing the oil in accordance with the method of claim 8, adding to the dewaxed oil solution so obtained, before recovery of the solvents therefrom, a further amount of the liquefied predominantly fluorine containing aromatic hydrocarbon derivative to produce a separation into two phases respectively containing relatively paraffinic and non-paraffinic constituents, and separating the phases from each other.

15. A method of dewaxing a mineral oil comprising dissolving the oil in from one to ten volumes of a solvent containing a non-selective fluorinated aromatic hydrocarbon derivative, the amount of fluorine therein contained in the proportions used being insufficient to cause a separation of the solution into two liquid layers at the dewaxing temperature, cooling the mixture to about the desired pour point, removing the precipitated wax therefrom, and recovering the solvent from the dewaxed oil solution and from the wax.

16. The method of dewaxing mineral oils described in claim 15 wherein the solvent consists exclusively of non-selective fluorinated aromatic hydrocarbon derivatives.

ERNST TERRES.
JOSEF MOOS.
HANS RAMSER.